I. SEDGWICK.
TRIPLE DRIVE TRACTOR PLOW.
APPLICATION FILED AUG. 25, 1920.

1,436,409.

Patented Nov. 21, 1922.
2 SHEETS—SHEET 1.

Fig. 1.

Inventor
Isham Sedgwick
by Graham + Harris
Attorneys.

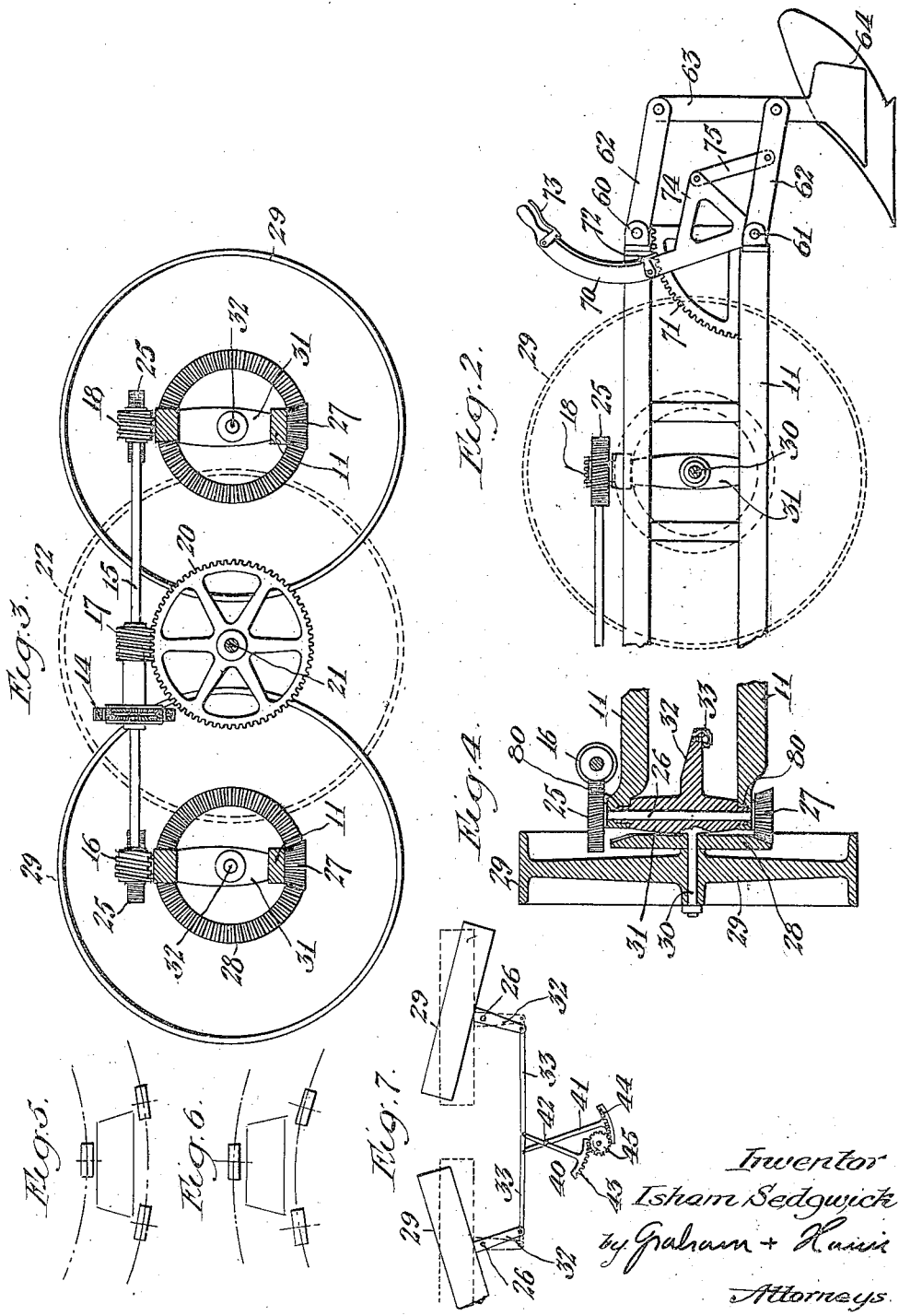

Patented Nov. 21, 1922.

1,436,409

UNITED STATES PATENT OFFICE.

ISHAM SEDGWICK, OF RIVERSIDE, CALIFORNIA.

TRIPLE-DRIVE TRACTOR PLOW.

Application filed August 25, 1920. Serial No. 406,016.

*To all whom it may concern:*

Be it known that I, ISHAM SEDGWICK, a citizen of the United States, residing at Riverside, county of Riverside, and State of California, have invented a new and useful Improvement Comprising a Triple - Drive Tractor Plow, illustrated in the enclosed drawing.

An object of my invention is to provide a tractor having a frame on one side of which is secured a central wheel, and on the other side of which are secured two tandem wheels which are mounted on vertical axis so that they may be turned to change the course of the tractor.

A further object is to provide means in such a tractor for driving all three wheels.

A further object is to provide means by which the driver of the tractor may turn the tandem wheels about said vertical axis so that they will run on a single circular track and thus turn the tractor.

A further object is to provide a tractor having a gang of plows at either end, these plows being arranged in echelon.

A further object is to provide a very rigid form of support for each plow so arranged as to take the side thrust and at the same time to raise and lower the plow and secure it in any position.

Further objects and advantages will be made evident hereinafter.

The invention resides in the novel combination and arrangement of parts shown in the drawing and described more in detail hereinafter.

Referring to the drawings which are for illustrative purposes only,

Fig. 1 is a plan view of a preferred form of my invention.

Fig. 2 is a side elevation of a portion of my invention.

Fig. 3 is a sectional elevation on a plane represented by the line 3—3 of Fig. 1.

Fig. 4 is a section thru one of the wheels.

Fig. 5 and Fig. 6 are diagrams.

Fig. 7 is a view of the turning mechanism.

In the embodiment of my invention shown in these drawings, a frame 11 is provided in which an engine 12 is secured, this engine driving a gear 13 thru a transmission 14 containing a clutch in accordance with standard tractor practice. The gear 13 drives a differential gear 14 which is connected to a drive shaft 15 and a spiral gear 17 which is free to turn on the shaft 15. The drive shaft 15 carries two spiral gears 16 and 18. The spiral gear 17 drives a gear 20 secured to a fixed axle 21 on which a central wheel 22 is secured. The gears 16 and 18 each drive gears 25 which are each secured to a pivot shaft 26 which is free to turn in the frame 11 as shown in Fig. 4 and which carries at its lower end a bevel pinion 27 which in turn drives a bevel gear 28 secured to a tandem wheel 29. There are two tandem wheels 29 located as shown in Fig. 1, each of these wheels turning on a stub shaft 30 which is secured in a member 31 which is free to turn in bearings 80 in the frame 11 about the pivot shaft 26. Each of the members 31 is provided with an extension 32 on which is pivoted a bar 33. One of the bars 33 engages an upper lever 40 and the other engages a lower lever 41. The levers 40 and 41 are pivoted about a common pivot 42 on the frame 11, the lever 40 carrying an external gear segment 43 and the lever 41 carrying an internal gear segment 44. The gear segments 43 and 44 are concentric with the point 42 and are engaged by a spur gear 45 operated by a hand wheel 46.

The tractor may be driven in either direction by suitable changes in the transmission 14 thru the gear drive, the tandem wheels 29 and the central wheel 22 being driven in the same direction. The tractor may be turned by operating the hand wheel 46 which throws the segments 43 and 44 in opposite directions and turns the arms 32 in opposite directions, turning the tandem wheels 29 into the position shown in the diagrams Fig. 5 and Fig. 6. These tandem wheels 29 are turned thru equal angles upon either side of the shaft 21 so that they tend to turn along the circular arcs shown in Fig. 5 and Fig. 6.

Secured upon pins 60 and 61 at each end of the tractor are links 62 which are secured to bars 63 which carry the plows 64. The links 62 of each set are three in number, consisting of a straight link 65, an offset link 66 and a cross link 67. The links 65 and 67 are pivoted at 68 to the bar 63 and the link 66 is pivoted at 69 substantially as shown in Fig. 1 so as to stiffen the bar 63 against sidewise movement. A lever 70 which may be locked to segment 71 by bolt 72 and handle 73 is provided with an extension 74 connected by a link 75 with one of the links 62. Any of the plows 64 may be lifted by means of the handle 73 and locked in place in the raised position. The tractor may be conveniently operated by running it back and forth reversing the direction of drive at each end of the furrow and raising the plows at one end and dropping them at the other.

I claim as my invention:

1. In a tractor, an earth turning member; a vertical bar extending upwardly from said member in a plane substantially vertical to the line of motion of said member; a frame; two horizontal bar pivots passing through said bar; two spacers each forming a portion of said bar, said pivots passing through said spacers; two straight links each pivoted at one end on said frame and at the other end on one of said pivots, said straight links being one above the other and substantially parallel with each other; two offset links each pivoted at one end on said frame and at the other end on the opposite end of one of said pivots from one of said straight bars; two cross links each pivoted at one end on said frame immediately adjacent to one of said offset links and at the other end on one of said pivots immediately adjacent to one of said straight links; and means for raising and lowering said bar.

2. In a tractor, an earth turning member; a vertical bar extending upwardly from said member in a plane substantially vertical to the line of motion of said member; a frame; two horizontal bar pivots passing through said bar; two spacers each forming a portion of said bar, said pivots passing through said spacers; two straight links each pivoted at one end on said frame and at the other end on one of said pivots, said straight links being one above the other and substantially parallel with each other; two offset links each pivoted at one end on said frame and at the other end on the opposite end of one of said pivots from one of said straight bars; two cross links each pivoted at one end on said frame immediately adjacent to one of said offset links and at the other end on one of said pivots immediately adjacent to one of said straight links; a lever system for raising and lowering said bar; and means for locking said system to hold said bar in any position.

In testimony whereof, I have hereunto set my hand at Los Angeles, California, this 14th day of August, 1920.

ISHAM SEDGWICK.